Patented Aug. 5, 1952

2,606,165

UNITED STATES PATENT OFFICE 2,606,165

FLOOR POLISHING COMPOSITIONS

Earl C. Chapin, Dayton, and Lloyd E. Weeks, Union City, Ohio, assignors to Monsanto Chemical Company, St. Louis, Mo., a corporation of Delaware No Drawing. Application December 30, 1948, Serial No. 68,396

10 Claims. (Cl. 260—28.5)

This invention relates to floor polishing compositions, which are particularly suitable for applying glossy finishes on wood, rubber, glass, tile and linoleum surfaces, either with or without paint or varnish finishes. More particularly the invention relates to emulsion type coating compositions which are stable to freezing and other conditions normally encountered in storage and use.

Floor coating compositions of the wax emulsion type are well known but are generally expensive because of the cost of the carnauba wax. Similarly, polymeric acrylic ester emulsions have been used for this purpose, but these produce surfaces too soft, too readily abraded, and too difficult to apply by conventional methods. They are also not capable of being buffed to a high luster.

The primary purpose of this invention is to provide an economical acrylate emulsion coating composition which spreads easily to a durable glossy finish, which is stable under normal conditions of storage and use, and which is capable of being buffed to a high glossy finish. A further purpose of this invention is to provide a convenient and economical method of polishing floors, furniture or other interior finishes.

In application Serial No. 36,260, filed June 30, 1948, by Charles L. Mills, Jr., now abandoned, there are described and claimed stable acrylate emulsions made by copolymerizing, in an aqueous emulsion, from 0.5 to 30 parts by weight of a polymerizable acid, such as acrylic acid, methacrylic acid, and cinnamic acid, with up to 99 and one-half percent of an acrylate ester, for example one of the alkyl acrylates or one of the alkyl methacrylates, and if desired another monomer, for example styrene, and thereafter subjecting these emulsion polymers to a treatment with ammonia, an alkali metal hydroxide, or amines having dissociation constants greater than $10^{-8}$. In accordance with this invention certain of these stable emulsions may be converted to valuable floor polishing compositions by compounding with chlorinated biphenyl. Further improved products may be made by adding small proportions of waxes.

The stable emulsions which may be treated in the manner of this invention are made by copolymerizing from 40 to 80 percent of an alkyl acrylate, wherein the alkyl group has up to eight carbon atoms, from 20 to 60 percent of styrene, and from 0.5 to 20 percent of either acrylic acid or methacrylic acid. These copolymers are prepared by conventional methods in aqueous emulsion, in the presence of from 0.001 to 1 percent by weight of a peroxy catalyst, for example sodium peroxide, benzoyl peroxide, hydrogen peroxide, sodium perborate, or the alkali metal salts of other peroxy acids. It is usually desirable to have present from 0.1 to 5 percent of an emulsion stabilizing agent, for example sodium oleate or other salt of a high molecular weight fatty acid or mixtures of the same, triethanol amine or other "amino soaps," the alkali metal salts of the rosin acids or mixtures thereof, sodium laurylsulfate or other water soluble salts of the half esters of sulfuric acid and long chain alkyl alcohols, the salts of sulfonated hydrocarbons, for example sodium alkylarylsulfonates, the salts of sulfosuccinic acid esters, and in general any organic compound containing both hydrophobic and hydrophilic radicals. After the emulsions are prepared by the conventional methods they are stabilized by the addition of a base having a dissociation constant greater than $10^{-8}$, for example ammonium hydroxide, sodium hydroxide, potassium hydroxide, ethylene diamine, morpholine, piperidine, aqueous methyl amine, and trimethyl benzyl ammonium hydroxide. The base is preferably added in an amount which is at least one percent of the stoichiometric equivalent of the unsaturated acid of the copolymer.

To enable the ready application of the stable emulsions it is desirable to add a chlorinated biphenyl or a mixture thereof having from 30 to 60 percent chlorine. The chlorinated biphenyl may be used to the extent of one to 25 parts by weight per hundred parts of polymer. It is frequently found desirable to add a small proportion, for example one to 40 parts by weight (per hundred parts of polymer) of an animal, vegetable, or mineral wax such as carnauba wax, montan wax, Japan wax, beeswax, paraffin wax, candelilla wax, manila resin or rosin, to render the coating compositions capable of being buffed to a high gloss subsequent to application and drying. Compositions not including the wax are, however, unusual coating compositions which dry directly to semi-glossy finishes without buffing.

The new coating compositions may be prepared by adding the chlorinated biphenyl and the wax directly to the stabilized emulsion. Alternatively the chlorinated biphenyl and wax may be separately emulsified with water by vigorous agitation, for example with a Waring blendor or a colloid mill, with or without an emulsion stabilizing agent, and thereafter mixing this emulsion with the copolymer emulsion. Another method of preparation involves the incorporation of the chlorinated biphenyl with the acrylate emulsion before or during the polymerization, and thereafter blending the resulting emulsion with a separately prepared wax emulsion. Variations of these methods will be apparent to one skilled in the art. However prepared, the solid content of the emulsions may be from 4 to 50 percent by weight, and preferably will be between 8 and 20 percent.

Further details of the preparation of the new compositions are set forth with respect to the following examples.

Example 1

A 2-liter, 3-necked flask was provided with a reflux condenser, a rotary stirring device and a thermometer well. The flask was charged with 2000 parts by weight of water, 5 parts of the 2-ethylhexyl ester of sodium sulfosuccinic acid, and one part of potassium persulfate. The flask and its contents was heated to about 80° C. and thereafter a mixture of 700 parts of ethyl acrylate, 270 parts of styrene and 30 parts of acrylic acid were added thereto gradually over a period of three and one-half hours at a rate which permitted the maintenance of a reflux temperature of 86° C. A 99 percent yield of polymer was obtained. The emulsion was treated with 56 parts of 28 percent ammonium hydroxide to effect its stabilization.

Example 2

A mixture of 88 grams of water, 12 grams of a chlorinated biphenyl containing 48 percent chlorine, and 1 gram of triethanolamine oleate was vigorously stirred in a Waring Blendor until a stable emulsion was formed. Five parts of this emulsion was mixed with 95 parts of the polymer emulsion (Example 1) which had been diluted to 12 percent solids content with water. The resulting mixed emulsion dried to a continuous glossy film when applied to rubber and linoleum surface with a cotton swab.

Example 3

A mixture of 88 grams of hot water, 12 grams of carnauba wax and 1 gram of triethanolamine oleate was vigorously stirred in a Waring blendor until an emulsion was formed. Ten parts of this wax emulsion and, 5 parts of the chlorinated biphenyl emulsion was mixed with 85 parts of the polymer emulsion (Example 1) diluted to 12 percent solids content with water. The resulting emulsion was frozen solid at −20° C. and allowed to thaw. This treatment did not precipitate the emulsion while similar treatment of a commercial floor wax composition caused almost complete precipitation. The mixed emulsion containing wax, chlorinated biphenyl and polymer gave an even glossy film when applied to rubber and linoleum surfaces which could be buffed to a high gloss. This polished surface was very resistant to water and possessed good wearing qualities.

The invention is defined by the following claims.

We claim:

1. A floor polishing composition which comprises an aqueous emulsion containing a copolymer of 0.5 to 20 percent by weight of methacrylic acid, from 40 to 80 percent of ethyl acrylate and from 20 to 60 percent of styrene, which emulsion has been treated with ammonia to the extent of at least one percent of the stoichiometric equivalent of the methacrylic acid, from one to 25 parts by weight per hundred parts of polymer of a chlorinated biphenyl containing 30 to 60 percent chlorine, and from one to 40 parts by weight per hundred parts of polymer of carnauba wax.

2. A floor polishing composition which comprises an aqueous emulsion containing a copolymer of 0.5 to 20 percent by weight of methacrylic acid, from 40 to 80 percent of ethyl acrylate and from 20 to 60 percent of styrene, which emulsion has been treated with ammonia to the extent of at least one percent of the stoichiometric equivalent of the methacrylic acid, from one to 25 parts by weight per hundred parts of polymer of a chlorinated biphenyl containing 30 to 60 percent chlorine, and from one to 40 parts by weight per hundred parts of polymer of montan wax.

3. A floor polishing composition which comprises an aqueous emulsion containing a copolymer of 0.5 to 20 percent by weight of acrylic acid, from 40 to 80 percent of ethyl acrylate and from 20 to 60 percent of styrene, which emulsion has been treated with ammonia to the extent of at least one percent of the stoichiometric equivalent of the acrylic acid, from one to 25 parts by weight per hundred parts of polymer of a chlorinated biphenyl containing 30 to 60 percent chlorine, and from one to 40 parts by weight per hundred parts of polymer of montan wax.

4. A floor polishing composition, which comprises an aqueous emulsion containing a copolymer of 0.5 to 20 percent by weight of acrylic acid, from 40 to 80 percent of an alkyl acrylate wherein the alkyl radical has up to eight carbon atoms, and from 20 to 60 percent of styrene, one to 25 parts by weight per hundred parts of polymer of a chlorinated biphenyl having from 30 to 60 percent of chlorine, and from one to 40 parts by weight per hundred parts of polymer of a compound of the group consisting of animal waxes, vegetable waxes and mineral waxes which emulsion has been treated with at least one percent of the stoichiometric equivalent of the acid in the polymer of a base having a dissociation constant at least as great as $10^{-8}$.

5. A floor polishing composition, which comprises an aqueous emulsion containing a copolymer of 0.5 to 20 percent by weight of methacrylic acid, from 40 to 80 percent of an alkyl acrylate wherein the alkyl radical has up to eight carbon atoms, and from 20 to 60 percent of styrene, one to 25 parts by weight per hundred parts of polymer of a chlorinated biphenyl having from 30 to 60 percent of chlorine, and from one to 40 parts by weight per hundred parts of polymer of a compound of the group consisting of animal waxes, vegetable waxes and mineral waxes, which emulsion has been treated with at least one percent of the stoichiometric equivalent of the acid in the polymer of a base having a dissociation constant at least as great as $10^{-8}$.

6. The composition defined by claim 4, wherein the wax is montan wax.

7. The composition defined by claim 5, wherein the wax is montan wax.

8. A floor polishing composition, which comprises an aqueous emulsion containing a copolymer of 0.5 to 20 per cent by weight of acrylic acid, from 40 to 80 per cent of an alkyl acrylate wherein the alkyl radical has up to eight carbon atoms, and from 20 to 60 per cent of styrene, one to 25 parts by weight per hundred parts of polymer of a chlorinated biphenyl having from 30 to 60 per cent of chlorine, and from one to 40 parts by weight per hundred parts of polymer, of carnauba wax, which emulsion has been treated with at least one per cent of the stoichiometric equivalent of the acid in the polymer of a base having a dissociation constant at least as great as $10^{-8}$.

9. A floor polishing composition, which comprises an aqueous emulsion containing a copolymer of 0.5 to 20 per cent by weight of methacrylic acid, from 40 to 80 per cent of an alkyl acrylate wherein the alkyl radical has up to eight carbon atoms, and from 20 to 60 per cent of styrene, one to 25 parts by weight per hundred parts of polymer of a chlorinated biphenyl having from 30 to 60 per cent of chlorine, and from one to 40 parts by weight per hundred parts of a polymer, of carnauba wax, which emulsion has been treated with at least one per cent of the stoichiometric equivalent of the acid in the polymer of a base having a dissociation constant at least as great as $10^{-8}$.

10. A floor polishing composition, which comprises an aqueous emulsion containing a copolymer of 0.5 to 20 per cent by weight of the compound of the group consisting of acrylic acid and methacrylic acid, from 40 to 80 per cent of an alkyl acrylate wherein the alkyl radical has up to eight carbon atoms, and from 20 to 60 per cent of styrene, one to 25 parts by weight per hundred parts of polymer of a chlorinated biphenyl having from 30 to 60 per cent of chlorine, and from one to 40 parts by weight per hundred parts of polymer of a compound of the group consisting of animal waxes, vegetable waxes and mineral waxes, which emulsion has been treated with at least one per cent of the stoichiometric equivalent of the acid in the polymer of a base having a dissociation constant at least as great as $10^{-8}$.

EARL C. CHAPIN.
LLOYD E. WEEKS.

REFERENCES CITED

The following references are of record in the file of this patent:

UNITED STATES PATENTS

| Number | Name | Date |
| --- | --- | --- |
| 2,317,725 | Billig | Apr. 27, 1943 |
| 2,374,414 | Cartwright | Apr. 24, 1945 |
| 2,397,093 | Dreyfus et al. | Mar. 26, 1946 |
| 2,464,826 | Neher et al. | Mar. 22, 1949 |

OTHER REFERENCES

"The Chemistry and Technology of Waxes" by Warth, published 1947 by Reinhold Publishing Corp., N. Y., N. Y., page vii (Table of Contents).

"Plasticizers and Resins" published May 1940 by Monsanto Chemical Co., pages 32-40.